US010726685B2

(12) United States Patent
Schäuble et al.

(10) Patent No.: US 10,726,685 B2
(45) Date of Patent: Jul. 28, 2020

(54) FIELD DEVICE OF AUTOMATION TECHNOLOGY

(71) Applicant: Endress+Hauser SE+Co. KG, Maulburg (DE)

(72) Inventors: Harald Schäuble, Lörrach (DE); Tobias Paul, Schopfheim (DE); Benjamin Monse, Vogtsburg (DE); Kaj Uppenkamp, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/086,681

(22) PCT Filed: Mar. 14, 2017

(86) PCT No.: PCT/EP2017/055981
§ 371 (c)(1),
(2) Date: Sep. 20, 2018

(87) PCT Pub. No.: WO2017/162483
PCT Pub. Date: Sep. 28, 2017

(65) Prior Publication Data
US 2019/0114879 A1    Apr. 18, 2019

(30) Foreign Application Priority Data

Mar. 21, 2016    (DE) .................. 10 2016 105 195

(51) Int. Cl.
G08B 5/36    (2006.01)
G01D 21/00    (2006.01)
G01D 7/00    (2006.01)
(52) U.S. Cl.
CPC .............. *G08B 5/36* (2013.01); *G01D 7/005* (2013.01); *G01D 21/00* (2013.01); *G09G 2310/00* (2013.01); *G09G 2320/00* (2013.01)

(58) Field of Classification Search
CPC ... G08B 5/22; G08B 5/36; G08B 5/38; G09G 2230/00; G09G 2310/06;
(Continued)

(56) References Cited

U.S. PATENT DOCUMENTS 4,736,186 A * 4/1988 Jones .................. G08B 7/064
340/331
6,082,867 A * 7/2000 Chien .................. A43B 1/0072
313/512
(Continued)

FOREIGN PATENT DOCUMENTS

CN    200976014 Y    11/2007
CN    105075151 A    11/2015
(Continued)

OTHER PUBLICATIONS

Search Report for German Patent Application No. 10 2016 105 195.0, German Patent Office, dated Dec. 9, 2016, 7 pp.
(Continued)

*Primary Examiner* — Van T Trieu
(74) *Attorney, Agent, or Firm* — Kelly J. Smith; Endress+Hauser (USA) Holding Inc.

(57) ABSTRACT

Field device of automation technology, comprising: a housing; arranged in or on the housing a first light emitting means, which serves as visual status display and which is arranged in such a manner that it is visible externally of the housing; arranged in the housing a second light emitting means, which is adapted to activate the first light emitting means such that the first light emitting means emits light; located in the housing a field device electronics, which is adapted to activate the second light emitting means via a signal with a predetermined frequency such that the second light emitting means emits light, such that the second light (Continued)

emitting means activates the first light emitting means such that the first light emitting means emits light.

11 Claims, 1 Drawing Sheet

(58) Field of Classification Search
CPC ... G09G 2310/0067; G09G 2310/0068; G09G 2310/00; G09G 2320/00; G09G 2320/064; G09G 2320/0646
See application file for complete search history.

(56) References Cited

U.S. PATENT DOCUMENTS

| | | | | |
|---|---|---|---|---|
| 6,286,983 | B1* | 9/2001 | Macher | B60Q 1/2665 |
| | | | | 315/169.3 |
| 2007/0257878 | A1* | 11/2007 | Tanaka | G09G 3/3413 |
| | | | | 345/99 |
| 2008/0013301 | A1 | 1/2008 | Staiger | |
| 2013/0147367 | A1 | 6/2013 | Cowburn | |
| 2014/0241730 | A1* | 8/2014 | Jovicic | H04L 7/0075 |
| | | | | 398/118 |
| 2015/0123888 | A1* | 5/2015 | Uemura | G09G 3/3426 |
| | | | | 345/102 |

FOREIGN PATENT DOCUMENTS

| | | | |
|---|---|---|---|
| DE | 102005025670 A1 | 12/2006 | |
| DE | 102006025861 A1 | 12/2007 | |
| EP | 2642185 A1 | 9/2013 | |
| WO | WO 2015154819 * | 4/2014 | ............ G01D 11/24 |
| WO | 2015154819 A1 | 10/2015 | |

OTHER PUBLICATIONS

Search Report for International Patent Application No. PCT/EP2017/055981, WIPO, dated May 29, 2017, 12 pp.

* cited by examiner

FIELD DEVICE OF AUTOMATION TECHNOLOGY

CROSS-REFERENCE TO RELATED APPLICATIONS

The present application is related to and claims the priority benefit of German Patent Application No. 10 2016 105 195.0, filed on Mar. 21, 2016 and International Patent Application No. PCT/EP2017/055981, filed on Mar. 14, 2017 the entire contents of which are incorporated herein by reference.

TECHNICAL FIELD

The invention relates to a field device of automation technology as well as to a method for activating a first light emitting means as visual status display of a field device.

BACKGROUND

In automation technology, field devices are often applied, which serve for registering and/or influencing process variables. Examples of such field devices are fill level measuring devices, mass flow measuring devices, pressure- and temperature measuring devices, pH-redox potential measuring devices, conductivity measuring devices, etc., which as sensors register the corresponding process variables, fill level, flow, pressure, temperature, pH-value, and conductivity value, respectively.

Serving for influencing process variables are so called actuators, e.g. valves, which control the flow of a medium in a pipeline section.

A large number of such field devices are produced and sold by the firm, Endress+Hauser.

Frequently, field devices are connected with superordinated units via a 4-20 mA electrical current loop. These superordinated units can serve for process control, process visualizing and process monitoring. A large number of the field devices used in the present state of the art are two-wire-, or four-wire-devices. Two conductor devices are connected via a line-pair with a receiver unit, which serves as superordinated unit. These devices are supplied with electrical current exclusively via the signal line. The electrical current, which flows via the signal line, serves for signal transmission between the field device and the receiver unit. An industrial standard for this type of signal transmission is the 4-20 mA technology.

In the case of two conductor devices, the provided input power is significantly limited. The electronics in the field device must be so embodied that it works reliably even in the case of a minimum signal current of 4 mA. As a rule, a microprocessor is present in the electronics and serves for measured value processing. The low provided input power represents a limiting factor especially also in the case of the visual status display. While the status display should be as bright as possible, there is, however, only a limited input power available.

SUMMARY

An object of the invention, therefore, is to provide a field device having a visual status display, which has, on the one hand, an increased visibility and which, on the other hand, has a lower energy requirement.

The object is achieved by the field device of independent claim 1 and by a method as claimed in independent claim 11.

Advantageous forms of embodiment will become evident from the dependent claims.

According to the invention, thus, a field device of automation technology is provided, comprising:
a housing;
arranged in or on the housing a first light emitting means, which serves as visual status display and which is arranged in such a manner that it is visible externally of the housing;
arranged in the housing a second light emitting means, which is adapted to excite the first light emitting means such that the first light emitting means emits light;
located in the housing a field device electronics, which is adapted to excite the second light emitting means via a signal with a predetermined frequency such that the second light emitting means emits light, such that the second light emitting means excites the first light emitting means such that the first light emitting means emits light.

According to the invention, a visual status display of a field device in the form of a first light emitting means is implemented in such a manner that the first light emitting means is excited to emit light via a second light emitting means, which has a small energy requirement. The energy requirement is further reduced by exciting the second light emitting means electrically with a certain frequency to control its emission of light, i.e. to make it blink. The exciting of the first light emitting means causes it to glow, i.e. also to emit light at points in time, when the second light emitting means is not electrically excited, in order to provide a status signal on the status display that appears continuous to the human eye. In order to increase the visibility of the visual status display further, the first light emitting means is arranged 2-dimensionally in the, or within or on the, housing of the field device.

An advantageous embodiment of the field device provides that the field device electronics is, furthermore, adapted to subject the signal to a pulse width modulation, so that the pulse width modulated signal excites the second light emitting means with the predetermined frequency such that the second light emitting means emits light.

An advantageous embodiment of the field device provides that the first light emitting means is arranged within the housing, preferably in a housing lid belonging to the housing, especially preferably at a glass window of the housing lid.

An alternative embodiment of the field device provides that the first light emitting means is arranged outside of the housing, preferably on a housing lid belonging to the housing, especially preferably at a glass window of the housing lid.

Another alternative embodiment of the field device provides that the housing has a housing lid with a glass window and the glass window is embodied in such a manner that it has the first light emitting means.

An advantageous embodiment of the field device provides that the first light emitting means includes at least one luminescent film or luminescent lacquer.

An advantageous embodiment of the field device provides that the second light emitting means includes at least one light-emitting diode, which can radiate in the visible region or at other wavelengths, for example, IR or UV.

An advantageous embodiment of the field device provides that the first light emitting means and the second light emitting means form a light emitting means pair, which emits light with a certain wavelength and wherein a plurality of, preferably three, light emitting means pairs are provided, which emit light with mutually differing wavelengths.

An advantageous embodiment of the field device provides that a plurality of first light emitting means are arranged next to one another.

An alternative embodiment of the field device provides that a plurality of first light emitting means are arranged on top of one another.

According to the invention, likewise provided is a method for activating a first light emitting means as visual status display of a field device, wherein the method provides that a second light emitting means, which is in optical contact with the first light emitting means, is excited with a predetermined frequency, so that the first light emitting means is excited by the second light emitting means such that the first light emitting means likewise emits light.

An advantageous form of embodiment of the method of the invention provides that the second light emitting means is excited with the predetermined frequency via a pulse width modulated signal.

BRIEF DESCRIPTION OF THE DRAWINGS

The invention will now be explained in greater detail based on the appended drawing, the figures of which show as follows.

DETAILED DESCRIPTION

Figure 1:
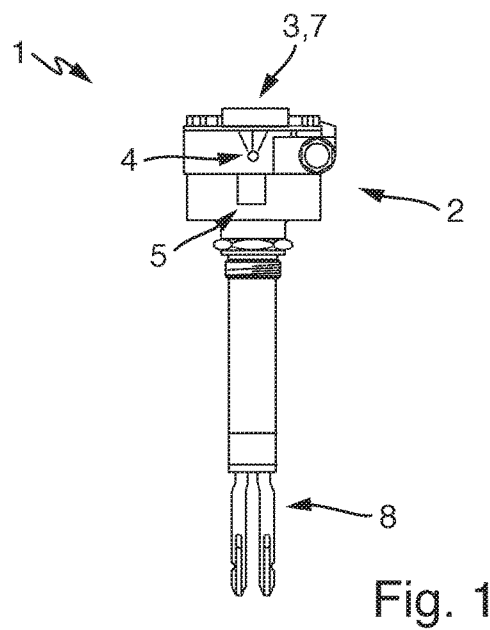
FIG. 1 shows a schematic representation of a field device, which serves as a limit switch.

FIG. 1 is a schematic representation of a field device 1, which serves as a limit switch. Field device 1 includes a housing 2, on which is mounted an oscillatable unit 8, for example, in the form an oscillatory fork, a single rod or a membrane, which extends partially into a medium.

Furthermore, the field device 1 includes a visual status display 3, which provides status information, for example, using different colors. Typically, the status information is encoded in such a manner that, in the case, in which the status display lights up green, such means that the oscillatable unit is not covered with medium, in the case, in which the status display lights up yellow, the oscillatable unit is covered with medium and in the case, in which the status display lights up red, the field device 1 has a technical disturbance.

Such status displays 3 should ideally also be reliably decipherable from a significant distance. At the same time, these should not have a too large energy requirement, since a field device 1 is subject to the above mentioned limitations as regards the available energy.

According to the invention, consequently, the field device 1 includes a first light emitting means 3, for example, in the form of a luminescent film or luminescent lacquer. Luminescent films and -lacquers are known from the state of the art and have the property that, when illuminated, they on their own part begin to emit light. Typically involved, in such case, are fluorescing or phosphorescing properties.

The first light emitting means 3 is, in such case, arranged on or in the housing of the field device 1 in such a manner that it is well visible outside of the housing. For example, the first light emitting means 3 can be placed behind a glass window 7, i.e. on the side of the glass window 7 of a housing lid 6 facing the housing interior, so that the first light emitting means 3 is well visible through the glass window 7 externally of the housing 2.

Alternatively, the first light emitting means 3 can also be placed on the side of a glass window of a housing lid facing away from the housing interior, i.e. on the outer surface of the housing lid 6.

Another alternative can provide that a glass window 7 of a housing lid 6 has itself luminescing properties, so that the glass window per se forms the first light emitting means.

The first light emitting means 3 is illuminated by means of a second light emitting means 4, for example, in the form of an LED, so that the first light emitting means 3 likewise begins to emit light. The second light emitting means 4 is, in such case, arranged in such a manner in the housing 2 of the field device 1 that it is in optical contact with the first light emitting means 3, i.e. a main beam of the second light emitting means 4 can propagate unimpeded from the second light emitting means 4 to the first light emitting means 3.

The first light emitting means 3 and the second light emitting means 4 thus form a light emitting means pair, which emits light with a specific wavelength. A variant of the invention can provide that a plurality of light emitting means pairs are provided, which emit light of different wavelengths. Thus, for example, to return to the above described example, three light emitting means pairs can be provided, which are embodied in such a manner that one light emitting means pair can emit green light, one yellow and one red, in order to signal corresponding status information using the status display.

Figure 2:
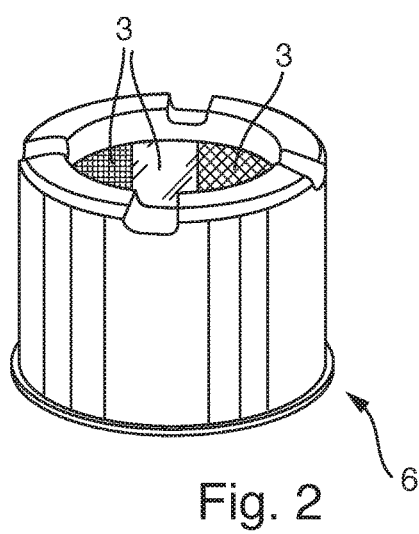
FIG. 2 shows an example of a housing lid, in the case of which three first light emitting means are arranged next to one another.
Figure 3:
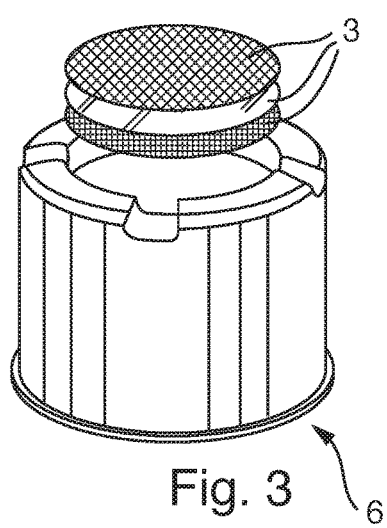
FIG. 3 shows an example of a housing lid, in the case of which three first light emitting means are arranged on top of one another.

In the case, in which a plurality of first light emitting means 3 is provided, these can either be arranged 2-dimensionally next to one another, such as shown, by way of example, in FIG. 2 or they can be arranged on top of one another, such as shown in FIG. 3. FIGS. 2 and 3 show such arrangements of the light emitting means in a housing lid having a glass window.

Of course, a combining of a status display of the invention with a classic display for measured value display and/or status display is possible.

The invention claimed is:

1. A field device of automation technology, comprising:
   a housing;
   a first light-emitting diode disposed in or on the housing to provide a visual status display visible externally of the housing;
   a second light-emitting diode disposed in the housing and adapted to activate the first light-emitting diode such that the first light-emitting diode emits light;
   wherein the second light-emitting diode and the first light-emitting diode are powered in series;
   a field device electronics disposed in the housing and configured to activate the second light-emitting diode via a signal with a predetermined frequency such that the second light-emitting diode emits light and activates the first light-emitting diode such that the first light-emitting diode emits light.

2. The field device of claim 1, wherein the field device electronics is configured to apply a pulse width modulation to the signal, such that the pulse width modulated signal activates the second light-emitting diode with the predetermined frequency such that the second light-emitting diode emits light.

3. The field device of claim 1, wherein the first light-emitting diode is disposed within a housing lid of the housing at a glass window of the housing lid.

4. The field device of claim 1, wherein the first light-emitting diode is disposed outside of the housing at a glass window of a housing lid of the housing.

5. The field device of claim 1, wherein the housing includes a housing lid with a glass window, wherein the glass window includes the first light-emitting diode.

6. The field device of claim 1, wherein the first light-emitting diode includes at least one luminescent film or luminescent lacquer.

7. The field device of claim 1, wherein the first light-emitting diode and the second light-emitting diode form a light-emitting diode pair configured to emit light with a certain wavelength, wherein the field device includes a plurality of light-emitting diode pairs configured to emit light with different wavelengths.

8. The field device of claim 1, wherein the field device includes a plurality of first light-emitting diode arranged next to one another.

9. The field device of claim 8, wherein the plurality of first light-emitting diodes are positioned vertically relative to one another.

10. A method for activating a first light-emitting diode as a visual status display of a field device, comprising the step of:
   activating a second light-emitting diode, which is in optical contact with the first light-emitting diode, with a predetermined frequency such that the first light-emitting diode is activated by the second light-emitting diode and emits light;
   wherein the second light-emitting diode and the first light-emitting diode are powered in series.

11. The method of claim 10, wherein the second light-emitting diode is activated with the predetermined frequency via a pulse width modulated signal.

* * * * *